(12) United States Patent
Sano et al.

(10) Patent No.: US 9,666,903 B2
(45) Date of Patent: May 30, 2017

(54) LITHIUM ION SECONDARY BATTERY

(71) Applicant: Panasonic Intellectual Property Management Co., Ltd., Osaka (JP)

(72) Inventors: Yoko Sano, Osaka (JP); Keisuke Yoneda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 36 days.

(21) Appl. No.: 14/762,457

(22) PCT Filed: Feb. 28, 2014

(86) PCT No.: PCT/JP2014/001097
§ 371 (c)(1),
(2) Date: Jul. 21, 2015

(87) PCT Pub. No.: WO2014/132660
PCT Pub. Date: Sep. 4, 2014

(65) Prior Publication Data
US 2015/0357679 A1  Dec. 10, 2015

(30) Foreign Application Priority Data
Mar. 1, 2013 (JP) ................. 2013-040476

(51) Int. Cl.
*H01M 2/02* (2006.01)
*H01M 10/0566* (2010.01)
(Continued)

(52) U.S. Cl.
CPC ....... *H01M 10/0566* (2013.01); *H01M 2/022* (2013.01); *H01M 2/046* (2013.01);
(Continued)

(58) Field of Classification Search
CPC ............. H01M 10/0566; H01M 2/046; H01M 10/0525; H01M 2/022; H01M 2/0413;
(Continued)

(56) References Cited

U.S. PATENT DOCUMENTS 6,159,253 A * 12/2000 Lund ................... H01M 2/18
                                                                29/623.1
6,258,477 B1   7/2001 Kashihara et al.
(Continued)

FOREIGN PATENT DOCUMENTS

CN       101183730 A   5/2008
EP       0 973 213 A1  1/2000
(Continued)

OTHER PUBLICATIONS

Machine translation of JP 2000-285959, retrived from <https://www.j-platpat.inpit.go.jp/web/all/top/BTmTopEnglishPage> on Sep. 27, 2016.*
(Continued)

*Primary Examiner* — Cynthia K Walls
(74) *Attorney, Agent, or Firm* — McDermott Will & Emery LLP

(57) ABSTRACT

There is provided a cylindrical pin-type lithium-ion secondary battery having excellent high temperature storage characteristics and charge-discharge cycle characteristics. The battery includes: a bottom-closed cylindrical battery case having an opening portion; a wound-type electrode assembly and a non-aqueous electrolyte housed in the battery case; and a sealing plate sealing the opening portion. The battery has: an outer diameter R of 3 to 6.5 mm; a height H of 15 to 65 mm; an amount of the non-aqueous electrolyte per discharge capacity of 1 mAh of 1.7 to 2.8 μL; and a packing ratio of 71 to 85%.

8 Claims, 1 Drawing Sheet

(51) Int. Cl.
*H01M 10/0587* (2010.01)
*H01M 2/04* (2006.01)
*H01M 10/0525* (2010.01)

(52) U.S. Cl.
CPC ..... *H01M 2/0413* (2013.01); *H01M 10/0525* (2013.01); *H01M 10/0587* (2013.01); *H01M 2220/30* (2013.01)

(58) Field of Classification Search
CPC .......... H01M 10/0587; H01M 2220/30; Y02E 60/122
See application file for complete search history.

(56) References Cited

U.S. PATENT DOCUMENTS

| | | | |
|---|---|---|---|
| 2001/0036571 A1* | 11/2001 | Oogami | H01M 2/023 429/94 |
| 2006/0035147 A1 | 2/2006 | Lam et al. | |
| 2008/0076021 A1 | 3/2008 | Takahashi | |
| 2008/0213668 A1* | 9/2008 | Muraoka | H01M 4/131 429/231.95 |
| 2009/0286155 A1* | 11/2009 | Takehara | C01B 25/455 429/199 |
| 2010/0015514 A1 | 1/2010 | Miyagi et al. | |
| 2012/0015238 A1 | 1/2012 | Minami et al. | |
| 2013/0022861 A1 | 1/2013 | Miyagi et al. | |

FOREIGN PATENT DOCUMENTS

| | | |
|---|---|---|
| EP | 1 939 971 A1 | 7/2008 |
| EP | 2 560 229 A2 | 2/2013 |
| JP | 01-294373 A | 11/1989 |
| JP | 4-206364 A | 7/1992 |
| JP | 11-144705 A | 5/1999 |
| JP | 2000-285959 A | 10/2000 |
| JP | 2001-229980 A | 8/2001 |
| JP | 2004-039587 A | 2/2004 |
| JP | 2005-085507 A | 3/2005 |
| JP | 2007-220455 A | 8/2007 |
| JP | 2007-227368 A | 9/2007 |
| JP | 2012-038702 A | 2/2012 |
| JP | 5022035 B2 | 9/2012 |
| WO | 99/25037 A1 | 5/1999 |
| WO | 2006/049027 A1 | 5/2006 |
| WO | 2007/055087 A1 | 5/2007 |

OTHER PUBLICATIONS

Extended European Search Report issued in European Application No. 14756323.3 dated Dec. 23, 2015.
International Search Report issued in corresponding International Patent Application No. PCT/JP2014/001097 on Apr. 8, 2011; 4 pages with English translation.
Chinese Office Action issued in corresponding Chinese Patent Application No. 201480004054.3, mailed on Sep. 2, 2016; with partial English translation.

\* cited by examiner

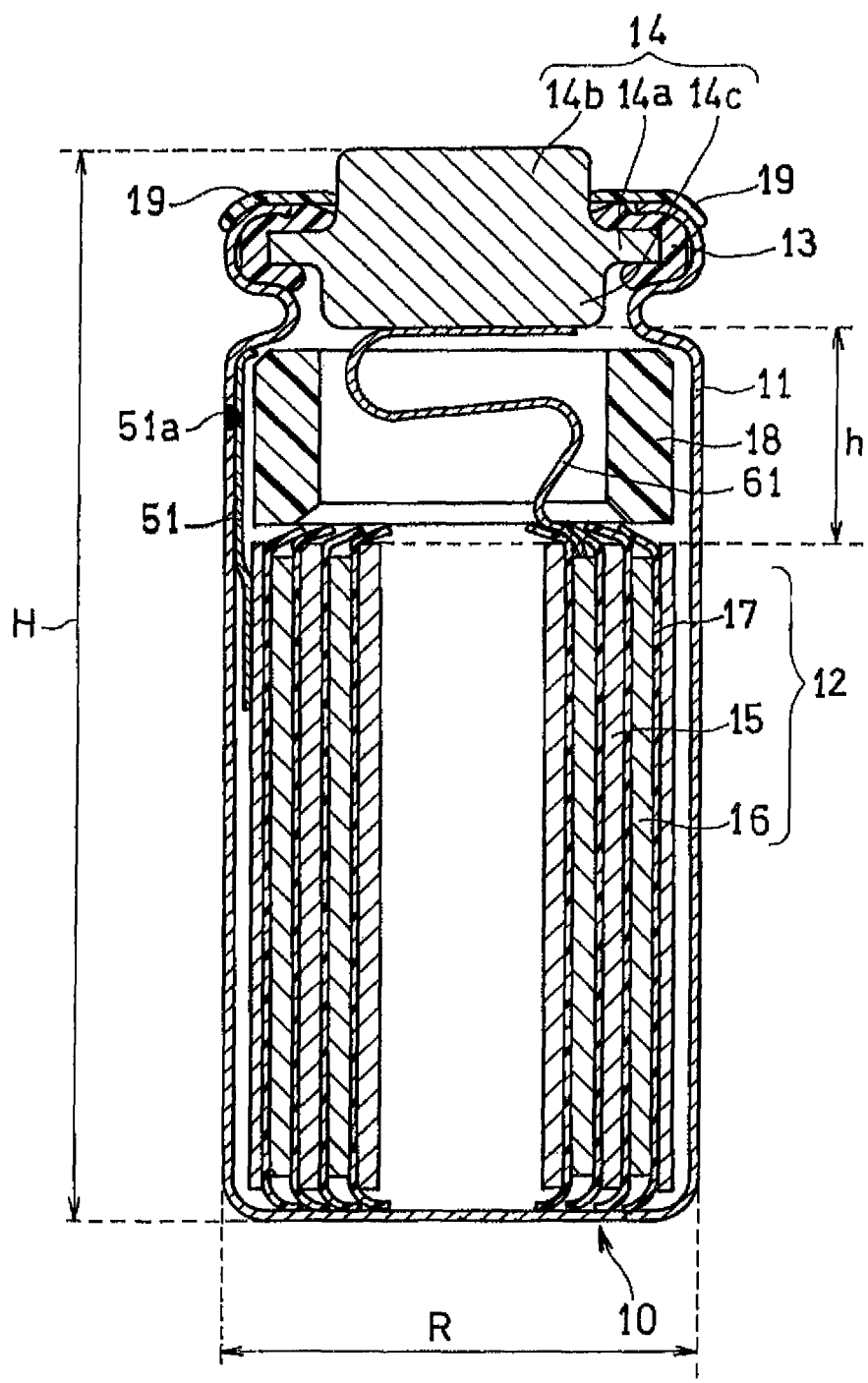

LITHIUM ION SECONDARY BATTERY

RELATED APPLICATIONS

This application is the U.S. National Phase under 35 U.S.C. §371 of International Patent Application No. PCT/JP2014/001097, filed on Feb. 28, 2014, which in turn claims the benefit of Japanese Application No. 2013-040476, filed on Mar. 1, 2013, the disclosures of which Applications are incorporated by reference herein.

TECHNICAL FIELD

The present invention relates to a cylindrical lithium-ion secondary battery (pin-type lithium-ion secondary battery) having a battery diameter of 6.5 mm or less.

PRIOR ART

The range of applications for devices which use batteries has been widening. Lithium-ion secondary batteries, in particular, has light weight, high capacity, and high output. Therefore, these batteries have been widely used as a driving power source in laptop computers, portable phones, and other portable electronic devices. For such use, conventionally, lithium-ion secondary batteries having a battery diameter of about 14 to 18 mm, a height of about 40 to 65 mm, and a high capacity of about 500 mAh or more have been widely used.

In lithium-ion secondary batteries having high capacity, typically used is a wound-type electrode assembly in which a positive electrode and a negative electrode are wound, with a separator interposed therebetween.

For example, in view of internal short circuit suppression and cycle characteristics, Patent Literature 1 proposes a wound-type electrode assembly in which separator width>negative electrode width>positive electrode width, a space is provided in the center of the electrode assembly, and the amount of the non-aqueous electrolyte is 2.5 to 4.5 µL per battery discharge capacity of 1 mAh.

In view of capacity and high temperature storage characteristics, Patent Literature 2 proposes adjusting the amount of the non-aqueous electrolyte in a non-aqueous electrolyte secondary battery with a capacity density per volume of 110 mAh/cc or more, to 1.8 µL to 2.4 µL per battery discharge capacity of 1 mAh. A wound-type electrode assembly is used in the secondary battery of Patent Literature 2.

A wound-type electrode assembly is typically formed by winding a positive electrode, a negative electrode, and a separator interposed therebetween around a winding core, and then pulling out the winding core from the resultant. By pulling out the winding core, a space (hereafter sometimes referred to as "space in the center of the electrode assembly") is produced in the center of the electrode assembly. For a cylindrical battery, an electrode assembly is formed using a columnar winding core and has a substantially cylindrical shape that corresponds to the shape of the winding core. The diameter of the space in the center of the electrode assembly is about 3 to 5 mm.

PRIOR ART

Patent Literatures

Patent Literature 1: Japanese Laid-Open Patent Publication No. 2001-229980

Patent Literature 2: Japanese Laid-Open Patent Publication No. 2000-285959

SUMMARY OF INVENTION

Technical Problem

Increase in the number of winding turns for a wound-type electrode assembly is advantageous in increasing capacity. On the other hand, the more the number of winding turns is increased, the greater the tension of the electrode assembly becomes; and this causes reduction in wettability of the electrode assembly with the non-aqueous electrolyte. Moreover, in a lithium-ion secondary battery having high capacity, the non-aqueous electrolyte is used in large amounts for the charge-discharge reaction and therefore tends to become insufficient with repeated charge and discharge. Here, wettability corresponds to the ease with which the electrode assembly (particularly the electrodes) absorbs the non-aqueous electrolyte. The degree of wettability can be evaluated based on, for example, the rate at which the non-aqueous electrolyte seeps into the electrode assembly (or the electrodes).

In a lithium-ion secondary battery having a large size as in Patent Literatures 1 and 2, the space in the center of the electrode assembly has a large volume and therefore can be utilized to secure a certain amount of the non-aqueous electrolyte.

On the other hand, in recent years, also with miniaturization and increased functionality of portable electronic devices as well as increased functionality of devices such as glasses (e.g., 3D glasses) and hearing aids, there has also been a growing demand for a small-size power source having high capacity and/or high output. For use in glasses and hearing aids for example, a particularly lightweight and small-size power source has been in demand, since such devices are sometimes required to be worn for long hours. Among such small-size power sources, a small-size battery specifically has dimensions of 3 to 6.5 mm in battery diameter and 15 to 65 mm in height. A small-size battery having such dimensions is sometimes called a pin-type battery. Despite its small size, a pin-type battery needs to secure high capacity and therefore preferably uses a wound-type electrode assembly. In a cylindrical pin-type battery, the diameter of the space in the center of the electrode assembly is, for example, 2.5 mm or less.

In a pin-type lithium-ion secondary battery, since a certain amount of capacity needs to be secured, the space in the center of the electrode assembly is small and the amount of the non-aqueous electrolyte that can be contained is small. Therefore, the battery tends to be influenced by volatilization of the solvent in the non-aqueous electrolyte during battery storage. This causes the amount of the non-aqueous electrolyte to become insufficient, resulting in variation in internal resistance. Thus, from a relatively early stage in charge and discharge, the charge-discharge reaction is not conducted sufficiently and it is difficult to secure high capacity. Particularly, volatilization of the solvent is prominent when the battery is stored at a high temperature. Therefore, in a pin-type lithium-ion secondary battery, it is difficult to secure excellent high temperature storage characteristics. However, this kind of problem does not occur in a lithium-ion secondary battery having a large size.

In a pin-type lithium-ion secondary battery, in order to increase the amount of the non-aqueous electrolyte, it is necessary to increase the filling ratio of the non-aqueous electrolyte and/or to reduce the volume occupied by the electrode assembly. When the filling ratio of the non-aqueous electrolyte is increased, the remaining space in the battery becomes smaller, and expansion and contraction of the electrodes during charge and discharge becomes restricted. As a result, the charge-discharge reaction would not be conducted sufficiently. Either way, high capacity would not be obtained and charge-discharge cycle characteristics would also degrade. On the other hand, in a lithium-ion secondary battery having a large size, the internal volume of the battery case is large, and it is possible to secure sufficient remaining space (i.e., the filling ratio of the non-aqueous electrolyte in the battery can be easily controlled). Therefore, expansion and contraction of the electrodes are unlikely to be restricted. Thus, the kind of problem as in a pin-type lithium-ion secondary battery does not occur.

An object of the present invention is to provide a cylindrical pin-type lithium-ion secondary battery having excellent high temperature storage characteristics and charge-discharge cycle characteristics.

Solution to Problem

One aspect of the present invention relates to a lithium-ion secondary battery having a cylindrical shape and including:
a bottom-closed cylindrical battery case having an opening portion;
a wound-type electrode assembly and a non-aqueous electrolyte housed in the battery case; and
a sealing plate sealing the opening portion,
the wound-type electrode assembly including a positive electrode, a negative electrode, and a separator interposed between the positive electrode and the negative electrode,
the lithium-ion secondary battery having:
an outer diameter R of 3 to 6.5 mm and a height H of 15 to 65 mm;
an amount of the non-aqueous electrolyte per discharge capacity of 1 mAh of the lithium-ion secondary battery being 1.7 to 2.8 μL; and
a packing ratio in the lithium-ion secondary battery being 71 to 85%.

Advantageous Effects of Invention

According to the foregoing aspect of the present invention, in a cylindrical pin-type lithium-ion secondary battery, the non-aqueous electrolyte in amounts sufficient to conduct the charge-discharge reaction can be secured, even after high temperature storage. That is, excellent high temperature storage characteristics is obtained. Moreover, it is possible to suppress restrictions on expansion and contraction of the electrodes during charge and discharge. Therefore, high capacity can be secured, thereby allowing obtaining of high charge-discharge cycle characteristics.

While the novel features of the present invention are set forth particularly in the appended claims, the present invention, both as to organization and content, will be better understood and appreciated, along with other objects and features thereof, from the following detailed description taken in conjunction with the drawing.

BRIEF DESCRIPTION OF DRAWING

FIG. 1 is a schematic vertical sectional view of a cylindrical lithium-ion secondary battery according to one embodiment of the present invention.

DESCRIPTION OF EMBODIMENT

The following is a detailed description of an embodiment of the present invention, given with reference to a drawing as appropriate and necessary.
(Lithium-Ion Secondary Battery)

A lithium-ion secondary battery according to an embodiment of the present invention is a cylindrical one (pin-type lithium-ion secondary battery) including: a bottom-closed cylindrical battery case having an opening portion; a wound-type electrode assembly and a non-aqueous electrolyte housed in the battery case; and a sealing plate for sealing the opening portion.

The wound-type electrode assembly includes a positive electrode, a negative electrode, and a separator interposed between the positive electrode and the negative electrode. The lithium-ion secondary battery has an outer diameter R of 3 to 6.5 mm and a height H of 15 to 65 mm. The outer diameter R is preferably 3 to 5.5 mm. The height H is preferably 15 to 45 mm. The outer diameter R of the lithium-ion secondary battery corresponds to the maximum outer diameter of the battery case of the battery (battery after assembly). The height H of the battery corresponds to the height of the battery after assembly, and also corresponds to the distance from the bottom surface of the battery (outer bottom surface of the battery case) to the top surface of the battery (top surface of the sealing plate).

The amount of the non-aqueous electrolyte per discharge capacity of 1 mAh of the lithium-ion secondary battery is 1.7 to 2.8 μL. The packing ratio of the lithium-ion secondary battery is 71 to 85%.

By adjusting the amount of the non-aqueous electrolyte per discharge capacity of 1 mAh of the battery to fall within the foregoing range, even when the battery undergoes high temperature storage (or is exposed to high temperature environment), despite the battery being small in size, it is possible to secure the non-aqueous electrolyte in amounts sufficient to conduct the charge-discharge reaction. Since the non-aqueous electrolyte can thoroughly permeate the entire electrode assembly, the charge-discharge reaction can proceed evenly. Therefore, internal resistance can be made stable and high capacity can be secured. Such effects can also be obtained after high temperature storage. Thus, excellent high temperature storage characteristics are obtained.

Moreover, by adjusting the packing ratio in the battery to fall within the foregoing range, in the pin-type lithium-ion secondary battery, it is possible to suppress inhibition of expansion and contraction of the electrodes during charge and discharge. Thus, high capacity can be easily secured and excellent charge-discharge cycle characteristics can be obtained.

The discharge capacity of the lithium-ion secondary battery corresponds to the discharge capacity of when the battery is charged at a predetermined current (e.g., 0.1 It) until a predetermined end-of-charge voltage and then discharged at a predetermined current (e.g., 0.1 It) until a predetermined end-of-discharge voltage. For example, when a positive electrode active material including a lithium-containing transition metal compound and a negative electrode active material including a graphite material are used, the discharge capacity may be that of when the battery is charged at a constant current of 0.1 It until a closed circuit voltage of 4.2 V and then discharged at a constant current of 0.1 It until a closed circuit voltage of 2.5 V. Here, "It" represents the hour rate. When the amount of electricity corresponding to a nominal capacity (design capacity) C (mAh) is passed within t hours (h), a current I (mA) is expressed by C/t. The nominal capacity (design capacity) of the lithium-ion secondary battery is, for example, 9 to 300 mAh, preferably 15 to 200 mAh, and further preferably 15 to 100 mAh.

In calculating the amount of the non-aqueous electrolyte per discharge capacity of 1 mAh, the discharge capacity is preferably the initial discharge capacity. The initial discharge capacity corresponds to a discharge capacity of when, for example, a battery after preliminary charge and discharge is charged and discharged under the foregoing conditions. The initial discharge capacity may also correspond to a discharge capacity of when a battery left for a predetermined period of time (e.g., 3 months) after preliminary charge and discharge is then charged and discharged under the foregoing conditions. For example, in the case of a commercially-available lithium-ion secondary battery, a discharge capacity of when the battery is charged and discharged under the foregoing conditions during its initial use, can be regarded as corresponding to the initial discharge capacity.

The packing ratio corresponds to the proportion (vol %) of the solid and liquid components housed in the battery (specifically, in the battery case) which occupy the internal volume of the battery. The total of the proportion (vol %) of the remaining space which occupies the internal volume of the battery and the packing ratio (vol %), is 100 vol %. The solid and liquid components include, for example, the electrode assembly (i.e., the electrodes and the separator), the non-aqueous electrolyte, leads, and an insulating ring disposed between the sealing plate and the electrode assembly. For example, the volumes of the solid components such as the leads and the insulating ring can be calculated from the sizes of the solid components. The volumes of the solid components such as the electrodes and the separator can be calculated based on the masses of the solid components and the specific gravities of the materials which constitute the solid components. The volumes of the liquid components such as the non-aqueous electrolyte can be obtained by taking the liquid components out of the battery and then measuring them.

The internal volume of the battery corresponds to the volume of the portion surrounded by the battery case (specifically, the inner wall surface of the battery case), a gasket, and the sealing plate (specifically, the respective surfaces of the gasket and the sealing plate) in the battery (battery after assembly). That is, the internal volume of the battery corresponds to the volume of the internal space surrounded by the battery case, the gasket, and the sealing plate (i.e., the internal space excluding the solid and liquid components housed in the battery case, such as the electrode assembly). In the pin-type lithium secondary battery, at the sealing portion of the battery, the volume of the space produced between the side surface of the sealing plate and the inner wall surface of the battery case is very small. Moreover, the roundness at the bottom portion of the battery case has very little influence on the internal volume of the battery. Therefore, based on an image of a vertical section of the battery, the inner diameter (maximum inner diameter) of the battery (battery after assembly) and the distance between the bottom surface of the sealing plate and the inner bottom surface of the battery case can be measured; and the volume calculated from the obtained measurement values can be regarded as an approximation of the internal volume of the battery.

The amount of the non-aqueous electrolyte and the packing ratio of the battery are both of, for example, a battery after preliminary charge and discharge; and may both be of a battery left for a predetermined period of time (e.g., 3 months) after preliminary charge and discharge. For example, in the case of a commercially-available lithium-ion secondary battery, the amount of the non-aqueous electrolyte and the packing ratio of the battery can be considered as corresponding to those before initial charge of the battery after its purchase.

The amount of the non-aqueous electrolyte per discharge capacity of 1 mAh is 1.7 µL or more, preferably 1.8 µL or more, and further preferably 2.1 µL or more. The amount of the non-aqueous electrolyte per discharge capacity of 1 mAh is 2.8 µL or less, preferably 2.7 µL or less or 2.6 µL or less, and further preferably 2.4 µL or less. The lower and upper limits of the amount of the non-aqueous electrolyte per discharge capacity of 1 mAh can be arbitrarily combined. The amount of the non-aqueous electrolyte per discharge capacity of 1 mAh is 1.7 to 2.8 µL, and may be, for example, 1.7 to 2.7 µL, 1.8 to 2.7 µL, 1.8 to 2.6 µL, or 1.8 to 2.4 µL.

If the amount of the non-aqueous electrolyte per discharge capacity of 1 mAh is less than 1.7 µL, the amount of the non-aqueous electrolyte would become smaller during storage, and a sufficient amount of the non-aqueous electrolyte for the charge-discharge reaction would not be securable. Therefore, high temperature storage characteristics would degrade. If the amount of the non-aqueous electrolyte per discharge capacity of 1 mAh exceeds 2.8 µL, the remaining space in the battery would become smaller. Therefore, expansion and contraction of the electrodes during charge and discharge would be inhibited, a sufficient charge-discharge reaction would not be possible, and high capacity would not be obtained. As a result, charge-discharge cycle characteristics would degrade. Moreover, if the amount of the non-aqueous electrolyte is increased while the remaining space is being secured, increase in capacity would not be possible. The amount of the non-aqueous electrolyte per discharge capacity of 1 mAh is preferably 1.8 µL or more, because long-term high temperature storage characteristics would be excellent. In view of high capacity, the amount of the non-aqueous electrolyte per discharge capacity of 1 mAh is preferably 2.7 µL or less or 2.6 µL or less. In view of obtaining more improved charge-discharge cycle characteristics, the amount of the non-aqueous electrolyte per discharge capacity of 1 mAh is preferably 2.4 µL or less.

The packing ratio in the battery is 71% or more and preferably 72% or more. The packing ratio is 85% or less and preferably 83% or less; and is preferably 80% or less in view of easily securing more improved charge-discharge cycle characteristics. The lower and upper limits of the packing ratio can be arbitrarily combined. The packing ratio is 71 to 85%, and may be 71 to 83% or 72 to 83%. If the packing ratio is less than 71%, the non-aqueous electrolyte would decrease considerably during storage, internal resistance would become too large, and sufficient capacity would not be securable. If the packing ratio exceeds 85%, expansion and contraction of the electrodes during charge and discharge would become more and more restricted, particularly in the course of repeated charge and discharge; and this would cause degradation in charge-discharge cycle characteristics.

The following is a specific description of the components of the battery.

(Wound-Type Electrode Assembly)

(Positive Electrode)

The positive electrode in the electrode assembly has: a positive electrode current collector; and a positive electrode active material layer formed on the surface of the positive electrode current collector.

The positive electrode current collector is preferably a metal foil such as an aluminum foil or an aluminum alloy foil. In view of miniaturization of the battery and strength of the positive electrode current collector, the thickness of the positive electrode current collector is preferably 10 to 50 µm.

The positive electrode active material layer may be formed on one surface of the positive electrode current collector, but is preferably formed on both surfaces thereof in view of increasing capacity. In the wound-type electrode assembly, at the start and/or end of winding, the positive electrode active material layer may be formed on only one surface of the positive electrode current collector, so as to prevent the positive electrode active material layer and the negative electrode active material layer from not facing each other.

The thickness of the positive electrode active material layer (positive electrode active material layer formed on one surface of the positive electrode current collector) is preferably 30 to 90 µm and further preferably 30 to 70 µm. The total thickness of the positive electrode may be, for example, 80 to 180 µm.

The positive electrode active material layer includes a positive electrode active material. The positive electrode active material is not particularly limited and can be any material usable in lithium-ion secondary batteries. Examples of the positive electrode active material include lithium-containing transition metal oxides such as lithium cobaltate ($LiCoO_2$), lithium nickelate ($LiNiO_2$), lithium manganate ($LiMn_2O_4$), and lithium-containing composite oxides in which part of the Co, Ni, or Mn in the foregoing compounds is substituted by other element(s) (e.g., transition metal element, typical element). The positive electrode active material can be used singly or in a combination of two or more.

In view of miniaturizing the battery and increasing the energy density, lithium-containing composite oxides are preferred. Specific examples of such oxides include: composite oxides represented by the general formula (1): $Li_{x1}Ni_{y1}M^a{}_{1-y1}O_2$; and composite oxides represented by the general formula (2): $Li_{x2}Ni_{y2}Co_{z1}M^b{}_{1-y2-z1}O_2$.

In the formula (1), the element $M^a$ is preferably at least one selected from the group consisting of Na, Mg, Sc, Y, Mn, Fe, Co, Cu, Zn, Al, Cr, Pb, Sb, and B. Moreover, x1 and y1 both preferably satisfy $0<x1≤1.2$ and $0.5<y1≤1.0$. Note that x1 is a value that changes by charge and discharge.

In the formula (2), the element $M^b$ is preferably at least one selected from the group consisting of Mg, Ba, Al, Ti, Sr, Ca, V, Fe, Cu, Bi, Y, Zr, Mo, Tc, Ru, Ta, and W. Moreover, x2, y2, and z1 preferably satisfy $0<x2≤1.2$ (preferably $0.9≤x2≤1.2$), $0.3≤y2≤0.9$, and $0.05≤z1≤0.5$, respectively. Note that x2 is a value that changes by charge and discharge. Moreover, in the formula (2), preferably $0.01≤1-y2-z1≤0.3$.

The positive electrode active material layer can include a binder and/or a conductive agent as necessary. The binder can be any one used in lithium-ion secondary batteries. Specific examples of the binder include fluorocarbon resins such as polyvinylidene fluoride (PVDF); rubbery polymers such as styrene-butadiene-based rubber and fluorine-containing rubber; and/or polyacrylic acid. The amount of the binder in the positive electrode active material layer is, for example, 1 to 5 parts by mass relative to 100 parts by mass of the positive electrode active material.

The conductive agent can be any one used in lithium-ion secondary batteries. Specific examples of the conductive agent include: carbonaceous materials such as graphites, carbon blacks, and carbon fibers; metal fibers; and/or conductive organic materials. When the conductive agent is used, the amount of the conductive agent in the positive electrode active material layer is, for example, 0.5 to 5 parts by mass relative to 100 parts by mass of the positive electrode active material.

The positive electrode can be formed by applying a positive electrode slurry including the positive electrode active material and a dispersion medium to the surface of the positive electrode current collector, followed by drying, and then compressing the resultant in the thickness direction. The binder and/or the conductive agent may be added to the positive electrode slurry. The dispersion medium can be, for example, water, an organic solvent such as N-methyl-2-pyrrolidone (NMP), or a mixed solvent thereof.

(Negative Electrode)

The negative electrode can include: a negative electrode current collector; and a negative electrode active material layer formed on the surface of the negative electrode current collector.

The negative electrode current collector is preferably a metal foil such as a copper foil or a copper alloy foil. Since use of the negative electrode current collector including copper allows smaller resistance, high output can be easily obtained.

The negative electrode active material layer may be formed on one surface of the negative electrode current collector, but is preferably formed on both surfaces thereof in view of increasing capacity. As with the positive electrode active material layer, in the wound-type electrode assembly, at the start and/or end of winding, the negative electrode active material layer may be formed on only one surface of the negative electrode current collector.

The thickness of the negative electrode active material layer (negative electrode active material layer formed on one surface of the negative electrode current collector) is preferably 30 to 120 µm and further preferably 35 to 100 µm. The total thickness of the negative electrode may be, for example, 80 to 250 µm.

The negative electrode active material layer includes a negative electrode active material. The negative electrode active material can be any carbon material usable in lithium-ion secondary batteries. The negative electrode active material is preferably a carbonaceous material capable of absorbing and releasing lithium ions. Examples of such carbonaceous material include: graphite materials (e.g., natural graphite, artificial graphite); and amorphous carbon materials.

The negative electrode active material layer can include a binder and/or a thickener as necessary.

The binder can be any one used in lithium-ion secondary batteries, and examples include fluorocarbon resins such as PVDF and rubbery polymers such as styrene-butadiene-based rubber. The thickener can be any one used in lithium-ion secondary batteries, and examples include cellulose ethers such as carboxymethyl cellulose (CMC).

The negative electrode can be formed as with the positive electrode. A negative electrode slurry includes the negative electrode active material and a dispersion medium, and may further include the binder and/or the thickener as necessary. The dispersion medium can be arbitrarily selected from those listed for the positive electrode.

(Separator)

The separator preferably has high ion permeability as well as moderate mechanical strength and insulation. The separator can be any one used in lithium-ion secondary batteries, and examples include a microporous membrane, a woven fabric, and/or a non-woven fabric. These separators preferably include resin, and may be a single layer, a composite layer, or a multi-layer. The layer(s) forming the separator may include one kind of material or two or more kinds of materials.

Examples of the resin include: polyolefin resins such as polypropylene and polyethylene; polyamide resins; and/or polyimide resins. Among these, a micro-porous membrane including a polyolefin resin such as polypropylene is suitable as the separator for lithium-ion secondary batteries, because of having excellent resistance as well as a shutdown function, i.e., the ability to close its pores when the battery rises to a certain temperature.

The thickness of the separator can be arbitrarily selected from a range of, for example, 5 to 300 µm, and is preferably 5 to 40 µm (or 10 to 40 µm) and further preferably 5 to 30 µm.

(Others)

A wound-type electrode assembly can be formed by winding the positive electrode, the negative electrode, and the separator interposed therebetween around a winding core, and then pulling out the winding core from the resultant. The winding core is columnar, and by using such winding core, space is produced in the center of the electrode assembly and a cylindrical electrode assembly can be obtained. Here, a cylindrical electrode assembly includes, for example, those shaped as a cylinder partially bent and those shaped as a cylinder slightly deformed in the direction of the cylinder diameter.

The diameter of the space in the center of the electrode assembly is preferably 0.7 mm or more and further preferably 0.8 mm or more. The foregoing diameter is, for example, 2.5 mm or less, preferably 2 mm or less, and further preferably 1.5 mm or less. The lower and upper limits of the foregoing diameter can be arbitrarily combined. The foregoing diameter may be 0.7 to 2.5 mm, 0.7 to 2 mm, 0.7 to 1.5 mm, or 0.8 to 1.5 mm.

When the diameter of the space in the center of the electrode assembly falls within the foregoing range, since the volume occupied by the electrode assembly can be sufficiently secured, it is further advantageous in view of increasing capacity. Moreover, since a winding core with greater strength can be used, the electrode assembly can be wound smoothly.

The diameter of the space in the center of the electrode assembly means a diameter of a circle which corresponds to the void portion in a section of the electrode assembly perpendicular to the axial direction (longitudinal direction) thereof (i.e., a circle having the same area as the void portion of the section).

The number of winding turns for the electrode assembly is preferably 3 to 10 and further preferably 3 to 8. When the number of winding turns falls within the foregoing range, excessive increase in the tension of the electrode assembly can be suppressed while high capacity is secured, and it becomes much easier to secure high wettability with the non-aqueous electrolyte. Therefore, despite used in small amounts, the non-aqueous electrolyte can thoroughly permeate the entire electrode assembly, and the charge-discharge reaction can proceed evenly. Thus, even with repeated charge and discharge, deposition of lithium metal is suppressed and occurrence of an internal short circuit can be suppressed.

The number of winding turns corresponds to the number of times of winding the part where the positive electrode active material layer and the negative electrode active material layer face each other.

The occupying ratio of the volume of the electrode assembly occupying the internal volume of the battery (also simply referred to as the occupying ratio of the electrode assembly) is preferably 43 to 54 vol % and further preferably 45 to 54 vol % or 45 to 53 vol %. When the occupying ratio of the electrode assembly falls within the foregoing range, high capacity can be secured more easily and better charge-discharge cycle characteristics can be obtained due to the non-aqueous electrolyte in sufficient amounts. The volume of the electrode assembly can be obtained by adding the total of the volumes of the electrodes and the separator forming the electrode assembly. The volumes of the electrodes and the separator can be obtained in the manner described above.

The positive electrode (or negative electrode) in the electrode assembly is electrically connected to the battery case or the sealing plate, via the lead. That is, one end portion of the lead is connected to the electrode (positive or negative electrode) and the other end portion of the lead is connected to the battery case or the sealing plate. Since the internal volume of the battery case is small, one end portion of the lead for electrical connection to the sealing plate is preferably connected to the electrode on the inner side of the electrode assembly; and one end portion of the lead for electrical connection to the battery case is preferably connected to the electrode on the outer side (preferably the outermost side) of the electrode assembly.

The polarities of the battery case and the sealing plate can be arbitrarily determined. In order to effectively utilize the internal volume of the battery case, the electrode assembly is preferably formed such that the electrode with the same polarity as the battery case comes on the outermost side, and the other end portion of the lead that extends from the electrode on the outermost side is preferably connected to the inner wall of the battery case. At that time, on the outermost side of the electrode assembly, the current collector is preferably left exposed, without having the active material layer formed thereon. The battery case may serve as either an external positive terminal or an external negative terminal. For example, the battery case may be connected to the negative electrode to serve as the external negative terminal, and the sealing plate may be connected to the positive electrode to serve as the external positive terminal.

The battery case and the sealing plate can be electrically connected to the leads, respectively, by a known method such as welding. In large-size batteries, typically, the battery case and the lead are connected at the bottom portion (inner bottom surface) of the battery case. Such connection is conducted by inserting a weld rod into the space in the center of the electrode assembly, and then welding the battery case and the lead together using the weld rod. In order to insert the weld rod, the diameter of the space in the center of the electrode assembly needs to be increased to a certain extent. Therefore, in the embodiment of the present invention, if such typical connection at the bottom portion of the battery case is employed, the volume occupied by the electrode assembly would have to be reduced. As a result, securing sufficient capacity would become difficult and/or permeation of the non-aqueous electrolyte into the electrode assembly would become inhibited.

Therefore, in the embodiment of the present invention, the battery case and the lead are preferably connected at the inner wall of the battery case. With the electrode assembly housed in the battery case (specifically, with the bottom surface of the electrode assembly in contact with the inner bottom surface of the battery case), the lead is preferably connected, particularly, to the inner wall on the side of the opening portion of the battery relative to the upper end surface (top surface) of the electrode assembly.

When the insulating ring is disposed between the electrode assembly and the sealing plate, the lead is preferably connected to the inner wall of the battery case, within the region between the inner wall of the battery case and the outer peripheral surface of the insulating ring.

The material for the positive electrode lead can be, for example, a metal such as aluminum, titanium, or nickel, or an alloy thereof. The material for the negative electrode lead can be, for example, a metal such as copper or nickel, or an alloy thereof.

The form of the lead is not particularly limited, and can be, for example, in wire form or sheet form (or ribbon form). For the lead for connection to the inner wall of the battery case, the width and/or the thickness are preferably arbitrarily selected, so that the electrode assembly would be easily inserted into the battery case and/or the strength of the lead would be secured, and/or the volume occupied by the lead in the battery case would be small. When the lead is in ribbon form, in view of securing a certain amount of weld strength and saving space, the width of the lead is preferably 1 to 2 mm and further preferably 1 to 1.5 mm. In view of the strength of the lead and easy insertion of the electrode assembly, the thickness of the lead is, for example, preferably 0.05 to 0.15 mm and further preferably 0.05 to 0.1 mm.

A ratio of the distance h between the bottom surface of the sealing plate and the upper end surface (top surface) of the electrode assembly, relative to the outer diameter R of the battery: h/R is, for example, 0.1 to 1.8, preferably 0.1 to 1.7, and further preferably 0.3 to 1.7. When the ratio h/R falls within the foregoing range, a larger remaining space can be easily secured even in a small-size battery, and therefore, the production process of the battery becomes stable. Specifically, there is stability in workability when the lead extending from the electrode is welded to the sealing plate, and also, stability in the disposition of the lead when the sealing plate is fitted in the battery case. Therefore, the non-aqueous electrolyte can be stably injected. Furthermore, it is advantageous in terms of increasing the capacity. In lithium-ion secondary batteries, the lead is housed between the bottom surface of the sealing plate and the upper end surface of the electrode assembly. In large-size batteries, the lead is roughly held between the sealing plate and the electrode assembly, and is therefore relatively resistant to vibration. However, in pin-type lithium-ion secondary batteries, the lead is fixed to the sealing plate and the electrode at respective weld portions, and therefore tends to have lower vibration resistance compared to large-size batteries. By setting the ratio h/R to 1.8 or less (preferably 1.7 or less), higher vibration resistance can be easily secured, and load on the lead can also be reduced.

The distance h can be measured based on an image of a vertical section of the battery. The distance h is measured, with the bottom surface of the electrode assembly housed in the battery case, in contact with the inner bottom surface of the battery case, such contact therebetween enabled by the weight of the electrode assembly. The upper end surface of the electrode assembly corresponds to the upper end surfaces of the electrodes in the electrode assembly; and, when one of the positive electrode and the negative electrode protrudes more outward than the other one thereof (upward, when the electrode assembly is inside the battery), the upper end surface of the electrode assembly corresponds to the end surface of the one of the electrodes in the electrode assembly (upper end surface of the one of the electrodes, when the electrode assembly is inside the battery).

(Non-Aqueous Electrolyte)

The non-aqueous electrolyte includes: a non-aqueous solvent; and a solute (supporting salt) dissolved in the non-aqueous solvent. The non-aqueous electrolyte may be in liquid or gel form.

The supporting salt can be any one (e.g., lithium salt) used in lithium-ion secondary batteries.

The concentration of the supporting salt in the non-aqueous electrolyte is not particularly limited, and is, for example, 0.5 to 2 mol/L.

Examples of the supporting salt (or lithium salt) include: lithium salts of fluorine-containing acid (e.g., lithium hexafluorophosphate ($LiPF_6$), lithium tetrafluoroborate ($LiBF_4$), lithium trifluuromethanesulfonate ($LiCF_3SO_3$)); lithium salts of chlorine-containing acid (e.g., lithium perchlorate ($LiClO_4$)); lithium salts of fluorine-containing acid imide (e.g., lithium bis(trifluoromethylsulfonyl)imide ($LiN(CF_3SO_2)_2$) lithium bis(pentafluoroethylsulfonyl)imide ($LiN(C_2F_5SO_2)_2$), lithium bis(trifluoromethylsulfonyl)(pentafluoroethylsulfonyl)imide ($LiN(CF_3SO_2)(C_2F_5SO_2)$)); and lithium salts of fluorine-containing acid methide (e.g., lithium tris(trifluoromethylsulfonyl)methide ($LiC(CF_3SO_2)_3$)). These supporting salts may be used singly or in combination of two or more.

Examples of the non-aqueous solvent include: cyclic carbonates (including derivatives (e.g., substitution product having a substituent)) such as propylene carbonate (PC), propylene carbonate derivatives, ethylene carbonate (EC), butylene carbonate, vinylene carbonate, and vinyl ethylene carbonate; chain carbonates such as dimethyl carbonate, diethyl carbonate, and ethyl methyl carbonate (EMC); chain ethers such as 1,2-dimethoxyethane, 1,2-diethoxyethane, trimethoxy-methane, and ethyl monoglyme; cyclic ethers (including derivatives (e.g., substitution product having a substituent)) such as tetrahydrofuran, 2-methyltetrahydrofuran, tetrahydrofuran derivatives, dioxolane, and dioxolane derivatives; lactones such as γ-butyrolactone; amides such as formamide, N,N-dimethylformamide, and acetamide; nitriles such as acetonitrile and propionitrile; nitroalkanes such as nitromethane; sulfoxides such as dimethyl sulfoxide; and sulfolane compounds such as sulfolane and methyl sulfolane. These may be used singly or in a combination of two or more.

(Battery Case)

The battery case is a bottom-closed cylindrical one having an opening portion. In the battery case, the electrode assembly and the non-aqueous electrolyte are housed.

The thickness (maximum thickness) of the bottom of the battery case is, for example, 0.08 to 0.2 mm and preferably 0.09 to 0.15 mm. The thickness (maximum thickness) of the side wall of the battery case is, for example, 0.08 to 0.2 mm and preferably 0.08 to 0.15 mm. These thicknesses are of the bottom and the side wall of the battery case in the battery after assembly.

The battery case is preferably a metal can. Examples of the material for the battery case include aluminum, aluminum alloys (e.g., those containing small amounts of other metal(s) such as manganese and/or copper), iron, and iron alloys (including stainless steel). The battery case may be plated (e.g., plated with nickel) as necessary. The material for the battery case can be arbitrarily selected in accordance with the polarity of the battery case.

(Sealing Plate)

In the lithium-ion secondary battery, the opening portion of the battery case is sealed with the sealing plate.

The sealing plate has a shape that is not particularly limited, and can be, for example, disc-shaped or disc-shaped with the center portion protruding in the thickness direction (i.e., hat-shaped). The sealing plate may have or may not have a space produced therein. The hat-shaped sealing plate includes, for example: that having an annular brim (flange) and a terminal portion protruding from the inner circumference of the brim in one direction of the thickness direction; and that having an annular brim and a terminal portion protruding from the inner circumference of the brim in one direction and the other direction of the thickness direction. The outer appearance of the latter one is similar to two hats overlapped at their respective brims that face each other. The protruding terminal portion may have a shape of a column or of a cylinder with a top surface (or a top surface and a bottom surface).

In a lithium-ion secondary battery having the sealing plate, the sealing plate is provided with a safety valve as a precaution against rise in internal pressure of the battery. In a high temperature environment, when gas is generated in the battery and the safety valve is repeatedly opened, the non-aqueous electrolyte is likely to leak. According to the embodiment of the present invention, since the packing ratio and the amount of the non-aqueous electrolyte are controlled to fall within specific ranges, generation of gas can be suppressed even in a high temperature environment. Therefore, even with use of the sealing plate having the safety valve, leakage of the non-aqueous electrolyte can be reduced. Moreover, by using the sealing plate having the safety valve, even with rise in internal pressure of the battery, safety can be secured without the sealing plate becoming detached. Alternatively, the sealing plate without the safety valve can be used. In that case, hermeticity of the battery can be further increased, and also, leakage of the non-aqueous electrolyte can be suppressed.

Examples of the material for the sealing plate include aluminum, aluminum alloys (e.g., those containing small amounts of other metal(s) such as manganese and/or copper), iron, and iron alloys (including stainless steel). The sealing plate may be plated (e.g., plated with nickel) as necessary. The material for the sealing plate can be arbitrarily selected in accordance with the polarity of the sealing plate.

The opening portion of the battery case can be sealed with the sealing plate by a known method. For sealing, welding may be utilized. However, it is preferable that the opening portion of the battery case is sealed with the sealing plate by crimping, with the gasket interposed therebetween. For crimp sealing, for example, the opening edge portion of the battery case can be bent inward toward the sealing plate, with the gasket interposed therebetween. If crimp sealing is employed, even when the sealing plate without the safety valve is used and internal pressure of the battery rises excessively, the sealing plate would come off and pressure would be released. Thus, safety would be secured.

(Gasket)

The gasket is interposed between the opening portion (specifically, the opening edge portion) of the battery case and the sealing plate (specifically, the peripheral edge portion of the sealing plate) and thus provides insulation therebetween and has the function of securing hermeticity of the battery.

The shape of the gasket is not particularly limited, and is preferably annular such that the peripheral edge portion is covered. When the sealing plate is shaped as a disc, the gasket may be shaped such that the peripheral edge of the disc would be covered. When the sealing plate is shaped as a hat, the gasket may be shaped such that the peripheral edge of the brim would be covered.

The material of the gasket can be an insulating material such as synthetic resin. Such material can by any material used for a gasket in lithium-ion secondary batteries. Specific examples of the material include: polyolefins such as polypropylene and polyethylene; fluorocarbon resins such as polytetrafluoroethylene and perfluoroalkoxy ethylene copolymer; polyphenylene sulfide; polyether ether ketone; polyamide; polyimide; and liquid crystal polymer. These materials may be used singly or in a combination of two or more.

The gasket can include a known additive (e.g., filler such as inorganic fibers) as necessary.

In view of further increasing hermeticity of the battery, a sealing agent may be disposed between the gasket and the sealing plate and/or the battery case as necessary. The sealing agent is made of an electrical insulating material.

In the battery after assembly, an insulating layer may be disposed on the area (on the outer side of the battery) where the battery case and the sealing plate are in close proximity to each other, with the gasket interposed therebetween. For example, when the battery case is sealed by bending the opening edge portion of the battery case inward toward the sealing plate, with the gasket interposed therebetween, the insulating layer may be disposed on at least the outer surface of the bent opening edge portion and the portions peripheral to the bent opening edge portion. Such peripheral portions include, for example: the area (on the outer side of the battery) where the sealing plate comes in close proximity to the battery case, with the gasket interposed therebetween; and the surface of the gasket positioned between the opening edge portion and the sealing plate and exposed to the outer side of the battery. The insulating layer can be formed after the battery is sealed and is therefore formed on the area on the outer side of the battery where the opening edge portion, the gasket, and the sealing plate are positioned. As necessary, the insulating layer may be formed on the inner side of the battery, such as on the inner surface of the opening edge portion, and between the gasket, the opening edge portion, and/or the sealing plate. The insulating layer is formed of an electrical insulating material.

Since the battery according to the embodiment of the present invention has a small size, an external short circuit is likely to occur when the sealing plate and the battery case have opposite polarities. Particularly, in attaching an external lead to the sealing plate, an external short circuit between the sealing plate and the battery case is likely to occur. In the case where the foregoing insulating layer is provided, it is favorable since occurrence of such external short circuit can be suppressed.

The insulating layer may be formed by applying a coating material including an electrical insulating material, or by attaching an insulating member (e.g., a toroidal member (e.g., sheet)) formed of an electrical insulating material to the appropriate portions of the outer surface of the battery. In the case of attaching the insulating member, an adhesive (or a bonding agent) may be applied between the insulating member and the outer surface of the battery as necessary. The adhesive is preferably made of an electrical insulating material.

Examples of the electrical insulating material for each of the sealing agent, the insulating layer, and the adhesive include resins (e.g., thermoplastic resins, curing resins (e.g., thermosetting resins, light curing resins, anaerobic curing resins)) and rubbers. These electrical insulating materials may be used singly or in a combination of two or more.

Resins are not particularly limited provided that they are electrically insulating, and examples include silicone resins, acrylic resins, phenolic resins, polyester resins (including alkyd resins), and rubber-like resins (e.g., elastomers). Examples of rubbers include diene rubbers (e.g., isoprene rubber, chloroprene rubber, butadiene rubber, styrene-butadiene rubber, acrylonitrile-butadiene rubber) and non-diene rubbers (e.g., butyl rubber, ethylene-propylene rubber, urethane rubber, silicone rubber, fluoro rubber, nitrile rubber, and acrylic rubber).

For formation of the insulating layer, and for the sealing agent and the adhesive, for example, a coating material including monomers or oligomer components of an electrical insulating material may be used. Such coating material is applied to appropriate portions and cured (or polymerized). Alternatively, a coating material including an electrical insulating material (polymer components) may be used.

(Others)

The lithium-ion secondary battery can be produced by housing the electrode assembly and the non-aqueous electrolyte in the battery case, and then sealing the opening portion of the battery case with the sealing plate.

An insulating ring or the like can be disposed between the upper part of the electrode assembly and the sealing plate. One end portion of the lead extending out of the electrode assembly is preferably passed through the hole of the insulating ring and connected to the bottom surface of the sealing plate.

The insulating ring can be any one used in lithium-ion secondary batteries. For the material of the insulating ring, an insulating material can be used; and for example, an arbitrary selection may be made from those listed for the gasket material. The insulating ring can include a known additive (e.g., filler such as inorganic fibers).

The thickness of the insulating ring is, for example, 0.5 to 2 mm, and preferably 1 to 1.5 mm. When the thickness of the insulating ring falls within the foregoing range, the packing ratio of the battery and the amount of the non-aqueous electrolyte can be easily adjusted, while moderate strength of the battery is maintained.

FIG. 1 is a schematic vertical sectional view of a cylindrical lithium-ion secondary battery according to an embodiment of the present invention.

A lithium-ion secondary battery 10 includes: a bottom-closed cylindrical battery case 11 having an opening portion; a wound-type electrode assembly 12 and a non-aqueous electrolyte (not illustrated) housed in the battery case 11; and a sealing plate 14 for sealing the opening portion of the battery case 11. The lithium-ion secondary battery 10 has: an outer diameter R corresponding to the maximum outer diameter of the battery case; and a height H corresponding to the distance between the upper end surface (top surface) of the sealing plate 14 and the outer bottom surface of the battery case 11.

The electrode assembly 12 includes: a negative electrode 15; a positive electrode 16; and a separator 17 interposed between the negative electrode 15 and the positive electrode 16, and is formed by winding the electrodes and the separator around a columnar winding core. After winding, the winding core is pulled out from the resultant, thereby producing a space corresponding to the shape of the winding core in the center of the electrode assembly 12. Therefore, the electrode assembly 12 is cylindrical. Moreover, the electrode assembly 12 is impregnated with the non-aqueous electrolyte.

The sealing plate 14 is hat-shaped and has an annular flange (brim) 14a and columnar terminal portions 14b and 14c protruding from the inner circumference of the brim 14a in the thickness direction. On the peripheral edge portion of the sealing plate 14, an annular insulating gasket 13 is disposed so as to cover the brim 14a. The opening edge portion of the battery case 11 is bent inward and crimped to the peripheral edge portion of the sealing plate 14, with the gasket 13 interposed therebetween, thereby to seal the battery case 11.

A space having a distance h is produced between the upper end surface (top surface) of the electrode assembly 12 and the bottom surface of the sealing plate 14. In the space, an insulating ring 18 is disposed to restrict contact between the electrode assembly 12 and the sealing plate 14.

One end portion of a positive electrode lead 61 in ribbon form is connected to the positive electrode 16 (e.g., exposed portion of positive electrode current collector) by a process such as welding, on the inner side of the wound-type electrode assembly 12; and the other end portion thereof is passed through a hole in the center of the insulating ring 18 and connected to the bottom surface of the sealing plate 14 by a process such as welding. That is, the positive electrode 16 and the sealing plate 14 are electrically connected via the positive electrode lead 61, and the sealing plate 14 has the function of an external positive terminal.

The portion of the negative electrode 15 on the outermost side of the wound-type electrode assembly 12 has a negative electrode active material layer formed on only one surface; and a negative electrode current collector is exposed at the other surface. The exposed portion of the negative electrode current collector faces the inner wall of the battery case 11. One end portion of a negative electrode lead 51 is connected to the negative electrode current collector on the outermost side; and the other end portion thereof is connected to the inner wall of the battery case 11 at a welding point 51a. That is, the negative electrode 15 and the battery case 11 are electrically connected via the negative electrode lead 51, and the battery case 11 has the function of an external negative terminal. The welding point 51a is formed on the inner wall on the side of the opening portion of the battery case 11 relative to the upper end surface of the electrode assembly 12. By connecting the negative electrode lead 51 and the negative electrode 15 at such position, the packing ratio of the battery and the amount of the non-aqueous electrolyte becomes easily adjustable, and also, the effect of improving high temperature storage characteristics and charge-discharge cycle characteristics becomes greater.

A toroidal insulating layer 19 formed of an electrical insulating material is disposed so as to cover the outer surface of the bent opening edge portion of the battery case 11 and the surface of the gasket peripheral to the bent opening edge portion. Viewed from the outer side of the battery, in the vicinity of the opening portion of the battery case 11, due to the insulating layer 19, the sealing plate 14 and the battery case 11 having opposite polarities would be separated more reliably. Thus, an external short circuit between the sealing plate 14 and the battery case 11 can be suppressed effectively.

The structure of the battery, the composition of the non-aqueous electrolyte, and others are not limited to the foregoing, and a known structure and a known composition can be selected arbitrarily.

According to the embodiment of the present invention, by adjusting the packing ratio of the battery and the amount of the non-aqueous electrolyte to specific amounts, there is obtained a small-size pin-type lithium-ion secondary battery having excellent high temperature storage characteristics and charge-discharge cycle characteristics, while also securing relatively high capacity.

The capacity density per volume of the lithium-ion secondary battery is preferably 60 mAh/cm$^3$ or more and further preferably 75 mAh/cm³ or more. The capacity density per volume is preferably 135 mAh/cm³ or less or 110 mAh/cm³ or less and further preferably less than 110 mAh/cm³ or 100 mAh/cm³ or less. The lower and upper limits of the capacity density per volume can be arbitrarily combined. The capacity density per volume may be 60 to 135 mAh/cm³, 60 to 110 mAh/cm³, 60 to 100 mAh/cm³, or 75 to 100 mAh/cm³.

When the capacity density per volume falls within the foregoing range, high wettability of the electrode assembly with the non-aqueous electrolyte can be obtained, while high capacity of the battery is also secured. Thus, high temperature storage characteristics and charge-discharge cycle characteristics can be improved, and also, high capacity can be secured.

The capacity density per volume of the lithium-ion secondary battery can be obtained by dividing the initial discharge capacity (mAh) of the battery by the volume (cm³) of the battery calculated from the outer diameter R and the height H of the battery.

EXAMPLES

Next, the present invention will be specifically described by way of Examples and Comparative Examples. The following Examples, however, are not to be construed as limiting in any way the scope of the present invention.

Example 1

A cylindrical lithium-ion secondary battery 10 as in FIG. 1 was produced by the following procedures.

(1) Production of Positive Electrode

Hundred parts by mass of lithium nickelate as a positive electrode active material, 4 parts by mass of acetylene black as a conductive agent, and 4 parts by mass of PVDF as a binder, with NMP added as a dispersion medium, were mixed, thereby to prepare a positive electrode slurry. The positive electrode slurry was applied to both surfaces of an aluminum foil (thickness: 15 μm) serving as a positive electrode current collector, followed by drying; and the resultant was then compressed in the thickness direction, thereby to produce a positive electrode 16 (thickness: 0.14 mm). During production, the positive electrode 16 was provided with an area (exposed portion of the positive electrode current collector) not having the positive electrode active material layer; and one end portion of a positive electrode lead (width: 1.0 mm, thickness: 0.05 mm) in ribbon form was connected to the exposed portion of the positive electrode current collector.

(2) Production of Negative Electrode

Hundred parts by mass of artificial graphite powder as a negative electrode active material, 1 part by mass of styrene-methacrylic acid-butadiene copolymer as a binder, and 1 part by mass of CMC as a thickener were mixed, and the resultant mixture was dispersed in deionized water, thereby to prepare a negative electrode slurry. The negative electrode slurry was applied to both surfaces of a copper foil (thickness: 10 μm) serving as a negative electrode current collector, followed by drying; and the resultant was then compressed in the thickness direction, thereby to produce a negative electrode 15 (thickness: 0.15 mm). At the portion of the negative electrode 15 on the outermost side of the electrode assembly, the negative electrode active material layer was not formed and the negative electrode current collector was thus exposed. One end portion of a negative electrode lead 51 (width: 1.5 mm, thickness: 0.1 mm) in ribbon form was connected to the exposed portion of the negative electrode current collector.

(3) Production of Electrode Assembly

A separator 17 in strip form was wedged into a slit portion of a winding core (columnar-shaped, with diameter of 0.8 mm) and folded at the slit portion to form a double fold. The separator 17, the positive electrode 16, and the negative electrode 15 were overlapped such that the positive electrode 16 and the negative electrode 15 would be wound with the separator 17 interposed therebetween. At that time, the positive electrode active material layer in the positive electrode 16 and the negative electrode active material layer in the negative electrode 15 were disposed so as to face each other. In that state, the positive electrode 16, the negative electrode 15, and the separator 17 were wound, with the winding core in the center, thereby to foam a wound-type electrode assembly 12. Then, winding was slightly loosened to pull out the winding core and a tape was attached to the end of winding to fix the electrode assembly 12. The number of winding turns for the electrode assembly was 3, and the diameter of the space in the center of the electrode assembly was about 0.9 mm.

(4) Preparation of Non-Aqueous Electrolyte $LiPF_6$ was dissolved in a mixed solvent including EC and EMC in a mass ratio of 1:1, thereby to prepare a non-aqueous electrolyte. At that time, the concentration of $LiPF_6$ in the non-aqueous electrolyte was 1.0 mol/L.

(5) Production of Cylindrical Lithium-Ion Secondary Battery

The electrode assembly 12 obtained in (3) above was inserted into a bottom-closed cylindrical battery case 11 formed of a nickel-plated iron plate and having an opening portion. Then, the other end portion of the negative electrode lead 51 was connected to the inner wall of the battery case 11, by welding at a welding point 51a. The welding point 51a was positioned on the side of the opening portion of the battery case 11 relative to the upper end surface of the electrode assembly 12. An insulating ring 18 was disposed on the upper part of the electrode assembly 12. The other end portion of the positive electrode lead 61 extending out of the electrode assembly 12 was passed through the hole in the insulating ring 18 and connected to the bottom surface of a sealing plate 14. At that time, an annular insulating gasket 13 was attached to the peripheral edge portion of the sealing plate 14. Into the battery case 11, 68 μL (2.1 μL per discharge capacity of 1 mAh) of the non-aqueous electrolyte prepared in (4) above was injected. The sealing plate 14 formed of nickel-plated iron was disposed on the opening portion of the battery case 11; and the opening edge portion of the battery case 11 was crimped toward the peripheral edge portion of the sealing plate 14, with the gasket 13 interposed therebetween, thereby to seal the battery case 11.

At the upper part of the battery, an insulating coating material including butyl rubber was applied toroidally, so as to cover the outer surface of the bent opening edge portion of the battery case 11 and the surface of the gasket 13 peripheral to the bent opening edge portion, thereby to form an insulating layer.

As such, a cylindrical lithium-ion secondary battery 10 (height H: 35 mm) having a nominal capacity of 35.0 mAh was obtained. Six batteries in total of a lithium-ion secondary battery A1 similar to the battery 10 were produced.

Examples 2 to 9 and Comparative Examples 1 to 2

Lithium-ion secondary batteries A2 to A9 and B1 to B2 were produced as in Example 1, except that the amount of the non-aqueous electrolyte injected (and the amount of the non-aqueous electrolyte per discharge capacity of 1 mAh) were changed as shown in Table 1. A2 to A9 are Examples and B1 to B2 are Comparative Examples. Six batteries in total were produced per Example and per Comparative Example.

Examples 10 to 14

Lithium-ion secondary batteries A10 to A14 were produced as in Example 1, except that the height of the electrode assembly 12 and the amount of the non-aqueous electrolyte injected were changed as shown in Table 1. The respective nominal capacities of the batteries were 29.2 mAh (A10), 30.2 mAh (A11), 32.9 mAh (A12), 36.3 mAh (A13), and 37.1 mAh (A14).

(Evaluation)

Each of the batteries of the Examples and Comparative Examples were evaluated in the following manner.

(1) Outer Diameter R, Ratio h/R, and Thickness of Battery Case

Based on an image of a cross section of the battery, an outer diameter R of the battery (battery case) was measured as 3.5 mm.

Based on an image of a vertical section of the battery, a distance h between the bottom surface of the sealing plate and the upper end surface of the electrode assembly was measured and then divided by the outer diameter R to obtain a ratio h/R; and then the average ratio h/R of the 6 batteries was calculated.

Based on an image of a section of the battery, the thickness (maximum thickness) of the bottom of the battery case and the thickness (maximum thickness) of the inner wall thereof were measured as 0.12 mm and 0.09 mm, respectively.

(2) Packing Ratio of Battery and Occupying Ratio of Electrode Assembly

For the packing ratio of the battery, the packing volume thereof was calculated and then divided by the inner volume thereof; and then the average packing ratio of the 6 batteries was calculated.

For the packing volume, the volumes of the positive electrode, the negative electrode, the separator, the electrolyte, the insulating ring disposed between the sealing plate and the electrode assembly, and the leads were obtained; and then the obtained volumes were totaled. The volumes of the positive electrode, the negative electrode, the separator, and the sealing plate were calculated based on the masses thereof and the specific gravities of the materials used therefor.

For the internal volume of the battery, based on an image of a vertical section of the battery, the maximum inner diameter of the battery case, and also, the distance from the inner bottom surface of the battery case to the bottom surface of the sealing plate were obtained; and the obtained values were calculated in the manner described above.

For the occupying ratio of the electrode assembly, the volumes of the positive electrode, the negative electrode, and the separator calculated as above were totaled, the obtained total was divided by the inner volume of the battery, and the average occupying ratio of the 6 batteries was calculated.

(3) Initial Internal Resistance

Each of the batteries of the Examples and the Comparative Examples underwent preliminary charge and discharge by the following steps. First, (a) the battery was charged for 4 hours at a constant current of 0.05 It and then discharged at a constant current of 0.05 C until a closed circuit voltage of 2.5 V. Next, (b) the battery was charged at a constant current of 0.1 It until a closed circuit voltage of 4.1 V and then discharged at a constant current of 0.1 It until a closed circuit voltage of 2.5 V. Furthermore, charge and discharge of (b) were repeated twice, thereby to complete preliminary charge and discharge. Next, the internal resistance of the battery was obtained by a four-terminal measurement technique using an alternating current frequency at 1 kHz; and the average internal resistance of the 6 batteries was calculated. The obtained average was referred to as the initial internal resistance. All of the batteries were able to successfully undergo preliminary charge and discharge, and were of satisfactory quality.

(4) Initial Discharge Capacity, Capacity Density Per Volume, and Charge-Discharge Cycle Characteristics Among the 6 batteries per Example and per Comparative Example whose initial resistances were measured in (3) above, the initial discharge capacities of the first 3 batteries were measured by the following steps.

In (c), each of the batteries was charged at a constant current of 0.1 It until a closed circuit voltage of 4.2 V and then discharged at a constant current of 0.1 It until a closed circuit voltage of 2.5 V. In charge and discharge of (c), the discharge voltage during discharge was monitored, the discharge capacity was obtained, and the average discharge capacity of the 3 batteries was calculated. The obtained average was referred to as the initial discharge capacity (mAh). The initial discharge capacity was divided by the volume ($cm^3$) of the battery calculated from the outer diameter R and the height H of the battery, thereby to obtain the capacity density per volume ($mAh/cm^3$).

Charge and discharge of (c) above were repeated for a total of 20 times. The discharge capacity at the $20^{th}$ discharge was obtained from the discharge voltage in the same manner as above; and then the average for the 3 batteries was calculated. The obtained average was converted to the rate relative to the initial discharge capacity (i.e., capacity retention rate (%)), which served as a reference to evaluate charge-discharge cycle characteristics. For Battery B1 of Comparative Example 1, charge-discharge cycle characteristics were not evaluated, since the initial discharge capacity was significantly low.

(5) High Temperature Storage Characteristics

Among the 6 batteries per Example and per Comparative Example whose initial resistances were measured in (3) above, high temperature storage characteristics of the remaining 3 batteries were evaluated by the following steps.

First, each of the batteries was stored for 5 days in an environment at a temperature of 85° C. and a relative humidity of 90%. The internal resistance of each of the batteries after storage was measured as in (3) above; and then the average for the 3 batteries was calculated. In all of the batteries of the Examples and Comparative Examples, leakage of the non-aqueous electrolyte was not observed after storage.

Table 1 shows the evaluation results of the Examples and Comparative Examples. In Table 1, the amount of the non-aqueous electrolyte injected (μL) and the amount of the non-aqueous electrolyte per unit discharge capacity (unit initial discharge capacity)(μL/mAh) are both shown as the amount of the non-aqueous electrolyte.

TABLE 1

|  | Amount of non-aqueous electrolyte | | Packing ratio | Occupying ratio of electrode assembly | Ratio | Initial characteristics | | | High temperature storage characteristics (Internal resistance) | Charge-Discharge cycle characteristics |
|---|---|---|---|---|---|---|---|---|---|---|
|  | | | | | | Internal resistance | Discharge capacity | Capacity density per volume | | |
|  | μL | μL/mAh | % | % | h/R | Ω | mAh | mAh/cm³ | Ω | % |
| B1 | 49 | 1.5 | 70 | 50 | 0.6 | 1.09 | 29.7 | 88.2 | 1.51 | — |
| A2 | 55 | 1.7 | 71 | 50 | 0.6 | 0.77 | 31.6 | 93.8 | 1.28 | 99.8 |
| A3 | 59 | 1.8 | 72 | 50 | 0.6 | 0.71 | 32 | 95 | 1.2 | 99.9 |
| A4 | 62 | 1.9 | 74 | 50 | 0.6 | 0.69 | 32.1 | 95.3 | 1.17 | 99.8 |
| A1 | 68 | 2.1 | 76 | 50 | 0.6 | 0.66 | 32.4 | 96.2 | 1.14 | 99.5 |
| A5 | 75 | 2.3 | 78 | 50 | 0.6 | 0.65 | 32.5 | 96.5 | 1.15 | 98.6 |
| A6 | 78 | 2.4 | 80 | 50 | 0.6 | 0.64 | 32.5 | 96.5 | 1.14 | 98.1 |
| A7 | 85 | 2.6 | 82 | 50 | 0.6 | 0.65 | 32.5 | 96.5 | 1.15 | 96 |
| A8 | 88 | 2.7 | 83 | 50 | 0.6 | 0.65 | 32.4 | 96.2 | 1.15 | 92 |
| A9 | 91 | 2.8 | 85 | 50 | 0.6 | 0.66 | 32.4 | 96.2 | 1.17 | 83.9 |
| B2 | 94 | 2.9 | 86 | 50 | 0.6 | 0.68 | 32.2 | 95.5 | 1.18 | 67.4 |
| A10 | 76 | 2.8 | 71 | 43 | 1.8 | 0.81 | 27.1 | 80.4 | 1.27 | 99.8 |
| A11 | 73 | 2.6 | 71 | 45 | 1.7 | 0.77 | 28 | 83.1 | 1.24 | 99.8 |
| A12 | 75 | 2.5 | 75 | 48 | 1.0 | 0.72 | 30.5 | 90.5 | 1.19 | 99.6 |
| A13 | 65 | 1.9 | 76 | 53 | 0.3 | 0.63 | 33.7 | 100.0 | 1.13 | 99.6 |
| A14 | 72 | 2.1 | 80 | 54 | 0.1 | 0.61 | 34.4 | 102.1 | 1.1 | 98 |

As shown in Table 1, in Examples 1 to 9, the initial internal resistances were small and stable, and high initial discharge capacities were secured. This was presumably because of good wettability of the electrodes and thorough permeation of the non-aqueous electrolyte to the entire electrode assembly. Even in Comparative Example 2 which included large amounts of the non-aqueous electrolyte, permeation of the non-aqueous electrolyte was presumably high, and as in the Examples, the initial internal resistance was small and the initial discharge capacity was high. In contrast, in Comparative Example 1, compared to the Examples, the initial internal resistance was higher and the initial discharge capacity was lower. This was presumably because the amount of the non-aqueous electrolyte was not sufficient, thereby causing the internal resistance to increase and thus causing polarization during discharge to increase.

In Examples 1 to 9, even after high temperature storage, internal resistances were small and stable, and excellent high temperature storage characteristics were obtained. This was presumably because, the batteries of the Examples were able to secure sufficient amounts of the non-aqueous electrolyte even after high temperature storage. Similarly, in Comparative Example 2 which included large amounts of the non-aqueous electrolyte, excellent high temperature storage characteristics were obtained. In contrast, in Comparative Example 1, internal resistance after high temperature storage was considerably higher compared to the Examples. This was presumably because the amount of the non-aqueous electrolyte injected was too small to begin with, thereby causing the influence of volatilization during high temperature storage to become apparent, and thus, increase in the internal resistance to become insuppressible.

In Examples 1-9, even with repeated charge and discharge, high capacity retention rates exceeding 90% were obtained and excellent charge-discharge cycle characteristics were exhibited. In Comparative Example 2, the capacity retention rate lowered more significantly compared to the Examples. The reason for such difference between the Examples and Comparative Example 2 was presumably because the packing ratio of the battery in Comparative Example 2 was too high, thereby not sufficiently allowing expansion and contraction of the electrode assembly that occur in repeated charge and discharge; and therefore, sufficient capacity of the battery was unable to be obtained.

In Examples 10 to 14 also, excellent effects (high temperature storage characteristics and charge-discharge cycle characteristics) similar or analogous to those in Examples 1 to 9 were obtained. In view of further increasing discharge capacity and capacity density per volume, the occupying ratio of the electrode assembly was preferably 45 vol % or more, and the ratio h/R was preferably 1.7 or less. In view of further improving cycle characteristics, the occupying ratio of the electrode assembly was preferably 53 vol % or less, and the ratio h/R was preferably 0.3 or more.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

INDUSTRIAL APPLICABILITY

Despite being small-size and lightweight, the lithium-ion secondary battery according to the embodiment of the present invention has excellent high temperature storage characteristics and charge-discharge cycle characteristics; and therefore can be suitably used as power source of various electronic devices, particularly various portable electronic devices (including, for example, glasses (e.g., 3D glasses), hearing aids, stylus pens, and wearable devices) which requires a small-size power source.

EXPLANATION OF REFERENCE NUMERALS 10 cylindrical lithium-ion secondary battery
11 battery case
12 wound-type electrode assembly
13 insulating gasket
14 sealing plate
14a flange 14b, 14c terminal portion
15 negative electrode
16 positive electrode
17 separator
18 insulating ring
19 insulating layer
51 negative electrode lead
61 positive electrode lead
51a welding point
R outer diameter of battery
H height of battery
h distance between upper end surface of electrode assembly and bottom surface of sealing plate

The invention claimed is:

1. A lithium-ion secondary battery having a cylindrical shape and comprising:
  a bottom-closed cylindrical battery case having an opening portion;
  a wound-type electrode assembly and a non-aqueous electrolyte housed in the battery case; and
  a sealing plate sealing the opening portion,
  the wound-type electrode assembly including:
  a positive electrode;
  a negative electrode; and
  a separator interposed between the positive electrode and the negative electrode, and
  the lithium-ion secondary battery having:
  an outer diameter R of 3 to 6.5 mm and a height H of 15 to 65 mm;
  an amount of the non-aqueous electrolyte per discharge capacity of 1 mAh of 1.7 to 2.8 µL;
  a packing ratio of 71 to 85%, and
  a capacity density per volume of 60 to 110 mAh/cm$^3$.

2. The lithium-ion secondary battery according to claim 1, wherein the packing ratio is 71 to 83%.

3. The lithium-ion secondary battery according to claim 1, wherein an occupying ratio of the electrode assembly occupying an internal volume of the lithium-ion secondary battery is 43 to 54 vol %.

4. The lithium-ion secondary battery according to claim 1, wherein the amount of the non-aqueous electrolyte per discharge capacity of 1 mAh is 1.8 to 2.7 µL.

5. The lithium-ion secondary battery according to claim 1, wherein the amount of the non-aqueous electrolyte per discharge capacity of 1 mAh is 1.8 to 2.4 µL.

6. The lithium-ion secondary battery according to claim 1, wherein the number of winding turns for the electrode assembly is 3 to 10.

7. The lithium-ion secondary battery according to claim 1,
  wherein the opening portion of the battery case is sealed with the sealing plate by bending an opening edge portion of the battery case inward toward the sealing plate, with a gasket interposed between the opening portion and the sealing plate, and
  an insulating layer formed of an electrical insulating material is disposed on at least an outer surface of the bent opening edge portion and a portion peripheral to the bent opening edge portion.

8. A lithium-ion secondary battery having a cylindrical shape and comprising:
  a bottom-closed cylindrical battery case having an opening portion;
  a wound-type electrode assembly and a non-aqueous electrolyte housed in the battery case; and
  a sealing plate sealing the opening portion,
  the wound-type electrode assembly including:
  a positive electrode;
  a negative electrode; and
  a separator interposed between the positive electrode and the negative electrode, and
  the lithium-ion secondary battery having:
  an outer diameter R of 3 to 6.5 mm and a height H of 15 to 65 mm;
  an amount of the non-aqueous electrolyte per discharge capacity of 1 mAh of 1.7 to 2.8 µL; and
  a packing ratio of 71 to 85%,
  wherein a ratio of a distance h between a bottom surface of the sealing plate and an upper end surface of the electrode assembly relative to the outer diameter R: h/R, is 0.1 to 1.7.

* * * * *